United States Patent [19]

Weinberg

[11] Patent Number: 4,568,946

[45] Date of Patent: Feb. 4, 1986

[54] CHARGE ELECTRODE MEANS FOR INK JET PRINTER

[75] Inventor: Hillar Weinberg, Girton, England

[73] Assignee: Willett International Limited, England

[21] Appl. No.: 547,834

[22] Filed: Nov. 2, 1983

[30] Foreign Application Priority Data

Nov. 5, 1982 [GB] United Kingdom ................ 8231624

[51] Int. Cl.[4] .............................................. G01D 15/16

[52] U.S. Cl. ....................................................... 346/75

[58] Field of Search .............................. 346/75, 140 R

[56] References Cited

U.S. PATENT DOCUMENTS

| | | | |
|---|---|---|---|
| 4,194,211 | 3/1980 | Hoffman | 346/75 |
| 4,334,232 | 6/1982 | Head | 346/75 |
| 4,346,389 | 8/1982 | Nagayama | 346/75 |

*Primary Examiner*—Joseph W. Hartary
*Attorney, Agent, or Firm*—Charles W. Helzer

[57] ABSTRACT

The invention provides charge electrode means for an ink jet printer, comprising a pair of members which are preferably planar members of electrically insulating material, mounted in spaced relation to one another so as to provide a gap between opposed surfaces thereof, opposed charge electrode layers of electrically conductive material on said opposed surfaces and means electrically connecting said opposed charge electrode layers.

8 Claims, 3 Drawing Figures

CHARGE ELECTRODE MEANS FOR INK JET PRINTER

Figure 1:
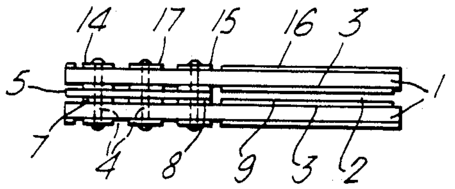

The present invention relates to charge electrode means for an ink jet printer.

Ink jet printers of the deflected continuous jet kind generally comprise at least one nozzle through which an electrically conductive liquid is supplied under pressure so as to issue from the nozzle as a continuous stream, piezo electric or other suitable means for applying pulses to the nozzle so as to cause said stream to break up into liquid drops of even size and spacing, a charge electrode for electrically charging selected drops of liquid, and deflector means for deflecting the electrically charged drops either onto a substrata to which the liquid is to be applied or to a drain or gutter, e.g., for return to reservoir, depending upon whether it is the charged or the uncharged drops which are directed onto the substrata. In order to ensure that the selected drops are properly electrically charged it is important that the electrical charge be applied thereto at the point where the drops break away from the stream of liquid and that each selected drop is fully charged just before it finally breaks away from the liquid stream. To this end at least one sensing electrode is usually associated with the charge electrode downstream thereof for sensing a charge on the selected drops and providing signals which can be used to control the timing of the charging electrical pulses applied to the charge electrode or the timing of modulating electrical pulses which are used to modulate the charging electrical pulses. Generally the charging electrode and the sensing electrode are combined into a single unit with the sensing electrode suitably electrically insulated and electrically screened from the charging electrode. In this case the combined charging electrode and sensing electrode unit usually comprises a laminate having a charge electrode layer of electrically conductive material, a sensing electrode layer of electrically conductive material, layers of electrically insulating material, e.g., a ceramic insulating material, on either side of each of said layers of electrically conductive material, and layers of electrical screening material, e.g., stainless steel, on either side of the sensing electrode layer and separated from the sensing electrode layer and the charge electrode layer by layers of said electric insulating material. The said laminate has a slot cut therein through which the stream of liquid passes, said slot usually being formed by making a saw cut in the laminate. Such combined charge electrodes and sensing electrodes are expensive to manufacture because of the necessity of laminating all the various layers together and moreover the forming of the slot therein causes difficulty because of the difficulty of sawing the laminate due to the widely differing natures of the materials in the different layers.

The present invention has as its object to provide charge electrode means which is simple and cheap to use and which when combined with a sensing electrode avoids the disadvantages of the known laminated combined charging electrode and sensing electrode.

The present invention provides charge electrode means for an ink jet printer, the charge electrode means comprising a pair of members mounted in spaced relation to one another so as to provide a gap between opposed surfaces thereof, opposed charge electrode layers of electrically conductive material on said opposed surfaces, and means electrically connecting said opposed charge electrode layers.

The charge electrode means of the present invention may further comprise sensing means for sensing a charge on the individual ink drops and providing signals which can be used to control the timing of the charging electrical pulses applied to the charge electrode layers or the timing of modulating electrical pulses used to modulate the charging electrical pulses. Such sensing means may comprise opposed sensing layers of electrically conductive material on said surfaces, said sensing layers each being on a different part of a said surface to the charge electrode layer on that surface and being electrically insulated and electrically screened from the charge electrode layer. Means may be provided which electrically connects the opposed sensing layers. The screening means may comprise opposed screening layers of electrically conducting material on said surfaces, the screening layers each being on a different part of a said surface to the charge electrode layer and the sensing layer on that surface so as to be electrically insulated therefrom and being positioned between the charge electrode layer and the sensing layer so as to electrically screen the sensing layer from the charge electrode layer. Means may be provided which electrically connects the opposed screening layers.

The said members are preferably planar members, e.g., of square or rectangular form, of electrically insulating material which are connected together along one margin thereof by suitable connecting means such as rivets, pins or the like extending therethrough and through a suitable spacer interposed between said margins so that the said gap is defined between the remainder of the planar members. The said rivets, pins or the like connecting the said members together may be of electrically conductive material and may serve as the means for electrically connecting the said opposed charge electrode layers, said sensing layers and/or said screening layers. Although the said members are preferably planar members, it will be understood that they could be of any other suitable form, e.g., could be part circular at least over that part or parts thereof on which said opposed electrically conductive layers are provided.

The electrically conductive layer or layers may be provided on said opposed surfaces by any suitable printed circuit, thin film or the like technique, e.g., by printing the electrically conductive layer or layers thereon by a screen or other suitable printing technique, by electrolytic or chemical deposition or by etching an electrically conductive cladding or layer on said opposed surfaces.

Figure 2:
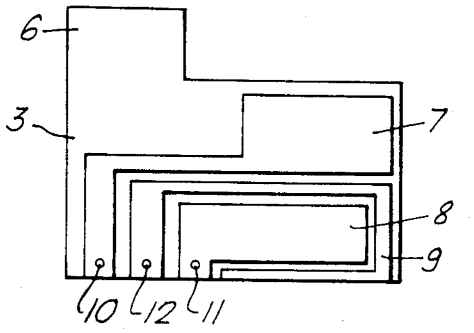
Figure 3:
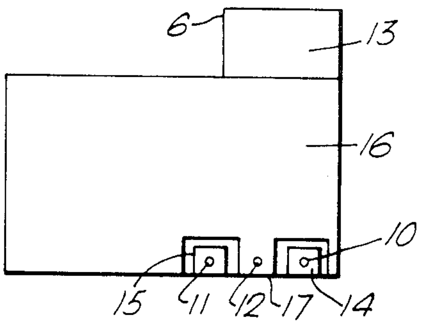

The invention will be more readily understood with reference to the accompanying diagrammatic drawings, in which:

FIG. 1 is an end view of charge electrode means according to the present invention, FIG. 2 is a plan view of one of the opposed surfaces of the charge electrode means of FIG. 1, and FIG. 3 is a plan view of the outer surface of one of the planar members of the charge electrode means of FIGS. 1 and 2.

Referring to the drawings it will be seen that the charge electrode means illustrated comprises a pair of planar members 1 of electrically insulating material such as fibreglass mounted in spaced relation to one another so as to provide a gap 2 between the opposed surfaces 3 thereof. The planar members 1 are of generally rectangular form as shown in FIG. 2 and are connected together along one end margin by means of pins or rivets 4 which extend through the planar members 1 and through a spacer 5 of electrically insulating material interposed between the said margins. The pins or rivets 4 are of electrically conductive material.

The generally rectangular members 1 each have an outward extension 6 thereon to facilitate the mounting of the charge electrode means in a suitable support (not shown).

Referring now to FIG. 2 it will be seen that each of the opposed surfaces 3 has thereon a charge electrode layer 7, a sensing electrode layer 8 and a screening layer 9. The layers 7, 8 and 9 all occupy different parts of the surfaces 3 and are all of electrically conductive material and are formed by any suitable circuit printing or thin film technique, e.g., by screen printing, or electrolytic or chemical deposition, or by etching an electrically conductive layer or cladding on the surface 3. In the assembled charge electrode means shown in FIG. 1 the charge electrode layers 7 are opposed to one another as are the two sensing electrode layers 8 and the two screening layers 9. The opposed charge electrode layers 7 are electrically connected together by means of one of the pins or rivets 4 which passes through opposed apertures 10 in the members 1 and charge electrode layers 7. In similar manner the sensing electrode layers 8 are connected together by a pin or rivet 4 which passes through aligned apertures 11 in the members 1 and the sensing electrode layers 8 and the screening layers 9 are connected together by at least one further pin or rivet 4 which passes through aligned apertures 12 in the members 1 and the screening layers 9.

Referring now to FIG. 3 it will be seen that the outer surface 13 of each of the members 1 has thereon a layer 14 of electrically conductive material which is electrically connected to the charge electrode layer 7 on the opposite side of the member by plating through the aperture 10, a layer 15 of electrically conductive material which is electrically connected to the sensing electrode layer 8 by plating through the aperture 11 and a screening layer 16 of electrically conductive material which is electrically connected to the screening layer 9 by plating through the aperture 12. The layers 14 and 15 and the portion 17 of screening layer 16 provide pads for connecting the electrically conductive layers 7, 8 and 9 into suitable electric circuits, e.g., as by soldering electrically conductive wires to said pads.

It will readily be appreciated that printed circuits are extremely cheap and easy to produce and that this combined with the simple construction of the charge electrode means of the present invention results in a charge electrode which is easy to manufacture, can readily be tailored to suit any particular requirement and is much cheaper than the known charge electrodes used in ink jet printers.

I claim:

1. Charge electrode means for an ink jet printer, the charge electrode means comprising:

(a) a pair of electrical insulating members mounted in spaced relation to one another so as to provide a gap between opposed surfaces thereof;

(b) opposed charge electrode layers of electrically conductive material on said opposed surfaces;

(c) means electrically connected to said opposed charge electrode layers for applying charging electric potentials thereto; and (d) sensing means for sensing a charge on individual ink drops passing between said opposed surfaces for deriving control signals which can be used to control the timing of charging electrical pulses applied to the charge electrode layers and the timing of modulating electrical pulses used to develop the charging electrical pulses, said sensing means comprising opposed sensing layers of electrically conductive material on said opposed surfaces with said sensing layers each being on a different part of a said opposed surface from the charge electrode layer formed on that respective surface and being electrically insulated and electrically screened from the charge electrode layer.

2. Charge electrode means according to claim 1, wherein means is provided which electrically connects the opposed sensing layers.

3. Charge electrode means according to claim 1, wherein screening means is provided comprising opposed screening layers of electrically conducting material on said surfaces, the screening layers each being on a different part of a said surface to the charge electrode layer and the sensing layer on that surface so as to be electrically insulated therefrom and being positioned between the charge electrode layer and the sensing layer so as to electrically screen the sensing layer from the charge electrode layer.

4. Charge electrode means according to claim 3, wherein means is provided which electrically connects the opposed screening layers.

5. Charge electrode means according to claim 3, wherein said members are planar members of electrically insulating material.

6. Charge electrode means according to claim 5, wherein said planar members are connected together along one margin thereof by connecting means which extend therethrough and through a spacer of electrically insulating material interposed between said margins so that said gap is defined between the remainder of the planar members.

7. Charge electrode means according to claim 6, wherein said connecting means are of electrically conductive material and screen to electrically connect together said charge electrode layers, said sensing layers and said screening layers.

8. Charge electrode means according to claim 5, wherein the outer surface of each of the planar members has on a first part thereof a first layer of electrically conductive material which is electrically connected to the charge electrode layer, on a second part thereof a second layer of electrically conductive material which is electrically connected to the sensing electrode layer and on a third part thereof a third layer of electrically conductive material which is electrically connected to the screening layer, the said first, second and third layers providing pads for connecting the electrically conductive charge electrode, sensing and screening layers into suitable electric circuits.

* * * * *